United States Patent
Cauduro Dias de Paiva et al.

(10) Patent No.: US 10,375,134 B2
(45) Date of Patent: Aug. 6, 2019

(54) METHOD AND DEVICE FOR LOW LATENCY GROUP-ADDRESSED STREAMING

(71) Applicant: Sennheiser electronic GmbH & Co. KG, Wedemark (DE)

(72) Inventors: Rafael Cauduro Dias de Paiva, Hamburg (DE); Daniel Fischer, Hamburg (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 0 days.

(21) Appl. No.: 15/440,165

(22) Filed: Feb. 23, 2017

(65) Prior Publication Data

US 2017/0244769 A1    Aug. 24, 2017

(30) Foreign Application Priority Data

Feb. 23, 2016    (DE) .......... 10 2016 103 153

(51) Int. Cl.

| | |
|---|---|
| *H04L 29/06* | (2006.01) |
| *H04W 8/00* | (2009.01) |
| *H04W 52/02* | (2009.01) |
| *H04W 84/12* | (2009.01) |

(52) U.S. Cl.
CPC ......... *H04L 65/4076* (2013.01); *H04L 65/80* (2013.01); *H04W 8/005* (2013.01); *H04W 52/0235* (2013.01); *H04W 84/12* (2013.01); *Y02D 70/00* (2018.01); *Y02D 70/142* (2018.01)

(58) Field of Classification Search
CPC ...... H04L 65/4076; H04L 65/80; H04W 4/06; H04W 8/005; H04W 52/02; H04W 52/0209; H04W 52/0216; H04W 52/0219; H04W 52/0222; H04W 52/0235; H04W 84/12; Y02D 70/00; Y02D 70/142
See application file for complete search history.

(56) References Cited

U.S. PATENT DOCUMENTS

| | | | |
|---|---|---|---|
| 7,505,447 B2 | 3/2009 | Kish et al. | |
| 8,411,608 B2 | 4/2013 | Chandra et al. | |
| 2005/0047356 A1* | 3/2005 | Fujii | G06F 1/3209 370/311 |
| 2006/0140186 A1* | 6/2006 | LoGalbo | H04L 1/1671 370/390 |
| 2015/0341758 A1* | 11/2015 | Aggarwal | H04W 4/06 370/312 |

\* cited by examiner

*Primary Examiner* — Khoa Huynh
(74) *Attorney, Agent, or Firm* — Kilpatrick Townsend & Stockton LLP

(57) ABSTRACT

A method of low latency group-addressed audio/video streaming in an IEEE 802.11 wireless network is provided. A data stream from at least one access point is transmitted to a plurality of wireless receiving stations as multicast traffic. The data stream comprises beacon frames at beacon intervals. Data packets of the data stream from the at least one access point are transmitted to a plurality of wireless receiving stations as multicast traffic as soon as available for transmission. The transmission of data packets that were transmitted during a previous beacon interval is repeated during a subsequent beacon interval as multicast traffic.

13 Claims, 2 Drawing Sheets

METHOD AND DEVICE FOR LOW LATENCY GROUP-ADDRESSED STREAMING

CROSS-REFERENCES TO RELATED APPLICATIONS

The present application claims priority to German Patent Application No. 102016103153.4, filed Feb. 23, 2016, the disclosure of which is hereby incorporated by reference in its entirety for all purposes.

BACKGROUND

For wireless audio streaming, wireless network according to IEEE 802.11 is typically used. According to IEEE 802.11 standard, the power consumption of receiving stations is reduced by switching off the radio unit of the station when the station is not transmitting or receiving data. In particular, the radio units of the receiving stations are turned on after a beacon frame. Wireless communication networks according to IEEE 802.11 standard include frames with a power management field which may be used by the stations in order to change their power management mode.

If a station is in power saving mode, it will only turn on its radio unit at the time it expects a beacon frame sent by the access point AP. The access points may include a traffic indication map TIM in the beacon frame. The traffic indication map TIM comprises information of those clients or receiving stations which are in power saving mode and for which forward traffic has arrived at the access point AP. The receiving station or client will awake when it receives a traffic indication map TIM informing the station that there is data buffered at the access point AP for it. The client or station will then send a power save (PS)-Poll message confirming that the radio is on and is able to receive the data from the access point. Thus, the access point can keep track of which clients are available and which are in power saving mode.

The IEEE 802.11 standard allows not only unicast and broadcast traffic, but also multicast (i.e. group-addressed) traffic. In the case of multicast traffic, however, if at least one of the clients or receiving stations in the group addressed by the group address is in power saving mode, then those data packets destined to this group are repeated after a beacon frame that contains a delivery traffic information map (DTIM) message. The DTIM message is sent in regular intervals, every N beacon frames. It indicates whether or not any group addressed traffic is available. If the beacon frame containing the DTIM message has a multicast or broadcast flag, the receiving stations or clients will receive their data traffic directly after the beacon frame.

FIG. 1a shows a schematic representation of a multicast transmission in a wireless network according to IEEE 802.11 standard. In FIG. 1a, multicast traffic for receiving stations not currently being in power saving mode PS (upper curve) M1 and multicast traffic for receiving stations currently being in power saving mode PS (lower graph) M2 is depicted. In this figure, the rectangles containing "Px" indicate a data packet with the index "x", whereas the rectangle containing the label "BE" indicates a beacon frame. For simplicity, it is assumed here that each beacon frame contains a DTIM message. If none of the receiving stations or clients in the group address is in power saving mode PS (i.e. all are ready to receive), the data packets in the access point AP which are destined to that group address will be transmitted as soon as they arrive at the access point AP. However, if any receiving station or client registered to the group address is in power saving mode (i.e. not ready to receive), as in the lower curve of FIG. 1a, the data packets must be buffered in the access point AP and will be transmitted after a beacon frame with a DTIM message. Accordingly, the multicast traffic for the receiving stations or clients that are registered to a group address where at least one receiving station or client is in power saving mode is also delayed and transmitted after the DTIM message. In the example of FIG. 1a, the packets P0,P1, . . . ,P4 are transmitted directly if no receiving station or client is in power saving mode, as in the upper curve, but they will be delayed until after the first beacon when at least one receiving station or client is in power saving mode, as in the lower curve. As a result, the packets P0,P1, . . . ,P4 are transmitted as a group P0-4 after the DTIM beacon frame BE. The same happens to the packets P5,P6, . . . ,P9, which are transmitted as a group P5-9 after the second DTIM beacon frame BE.

FIG. 1b discloses a flow chart of a multicast transmission according to FIG. 1a. In step S1, a new multicast packet is received at the access point. In step S2, it is determined if one of the stations is in power saving mode PS. If this is not the case, the flow continues to step S3 where the packet is transmitted without any extra delay. However, if one of the receiving stations is in power saving mode, the flow continues to step S4. Here, the packet is buffered and will be transmitted by the access point AP after a DTIM beacon frame.

Comparing the multicast traffic for the stations with and without power saving mode, it becomes apparent that the minimum delay or latency of a data stream is the interval between DTIM beacon frames if at least one receiving station is in power saving mode. As a result, even receiving stations that are not in power saving mode will experience the same latency if they belong to the same group address as another receiving station that is in power saving mode. Accordingly, the power saving mechanism according to IEEE 802.11 allows power savings, but may increase the delay or latency of the wireless communication. This is often disadvantageous, e.g. for real-time audio data or video data.

U.S. Pat. No. 8,411,608 B2 describes a WiFi multicaster. The traffic from the access point AP towards several receiving stations is received as multicast traffic at the access point and then converted into a number of unicast data streams. This will, however, increase the overall traffic in the wireless network and may lead to additional delay.

U.S. Pat. No. 7,505,447 B2 also shows a conversion of multicast traffic into unicast traffic within a WiFi wireless network.

US2015/0341758A discloses a method and apparatus to ensure that multicasts from access points sent in response to periodic beacons reach a variety of listening clients that may have longer sleep intervals than an interval between beacons. However, this does not reduce the latency for clients that are not in PS mode.

Thus, in addition to the IEEE 802.11 standard, further measures need to be taken in order to improve the wireless group-addressed streaming.

BRIEF SUMMARY

It is therefore an object of the invention to provide a method for low latency group-addressed streaming in an IEEE 802.11 wireless network with power saving capability and low latency.

This object is solved by a method for low latency group-addressed audio/video streaming in an IEEE 802.11 wireless network.

Therefore, methods for low latency group-addressed audio/video streaming in an IEEE 802.11 wireless network are provided. A data stream from at least one access point is transmitted to a plurality of wireless receiving stations as multicast traffic. The data stream comprises beacon frames at beacon intervals. It is assumed herein that each beacon interval begins with a beacon frame. Data packets of the data stream from the at least one access point are transmitted to a plurality of wireless receiving stations as multicast traffic as soon as possible for the access point, i.e. as soon as the data packets are available for transmission, and particularly before any beacon frame. The transmission of those data packets of the data stream which were transmitted during a previous beacon interval is repeated after a subsequent beacon frame as multicast traffic. In other words, multicast data packets that are addressed to a group of clients are transmitted twice if at least one of these clients is currently in PS mode: first, for those recipients that are not in PS mode, the data packets are transmitted as soon as possible and without waiting for a beacon frame (in particular, without waiting for a DTIM beacon frame). Then, for those recipients that are in PS mode, the data packets are transmitted again after the next DTIM beacon frame.

According to certain embodiments, a method of low latency group-addressed streaming in an IEEE 802.11 wireless network, executed by an access point device, comprises transmitting a data stream from the access point device to a plurality of wireless receiving stations as multicast traffic, wherein the data stream comprises beacon frames at beacon intervals, detecting that at least one of the wireless receiving stations is in power save mode or sleep mode, and upon said detecting: transmitting data packets of the data stream from the access point device to the plurality of wireless receiving stations as multicast traffic as soon as the data packets are available for transmission and during a first beacon interval, and repeating transmission of the data packets that were transmitted during the first beacon interval during a subsequent second beacon interval and after a beacon frame of the second beacon interval as multicast traffic.

According to certain embodiments, those data packets of the data stream which were transmitted during a previous beacon interval are buffered in the access point such that they can be re-transmitted during the second beacon interval after the beacon frame. According to a further aspect of the invention, the plurality of wireless receiving stations comprises a first and second set of receiving stations. The first set of receiving stations is not in a power saving mode or sleep mode, and the second set of receiving stations is in a power saving mode or sleep mode. Data packets of the data stream are firstly transmitted without any extra delay, as soon as they arrive in or at the access point, as multicast traffic. They will only be received by the first set of receiving stations, since the second set of receiving stations is in power saving mode or sleep mode at this point. Those data packets of the data stream which were transmitted during the previous beacon interval are re-transmitted after the current beacon frame. During that re-transmission, it is expected that the second set of receiving stations is in an active mode and thus, they are able to receive the packets. The first set of receiving stations will normally also receive this repetition. Their network interface is able to detect that it is a retransmission and will discard the packets. Similar to US2015/0341758A, it is additionally also possible to re-transmit the data packets again after a later beacon frame.

Further aspects of the invention are defined in the claims that follow.

BRIEF DESCRIPTION OF THE DRAWINGS

Further embodiments and advantages of the invention will now be described with reference to the figures, in which.

DETAILED DESCRIPTION

The present invention relates to a method of low latency group-addressed streaming and a device for low latency group-addressed streaming.

Figure 2:
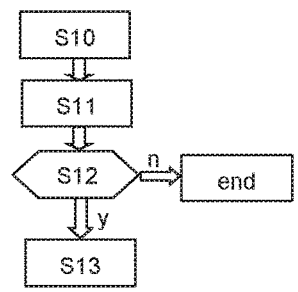
FIG. 2 discloses a flow chart of a multicast traffic in a wireless network according to the invention.

FIG. 2 discloses a flow chart of a multicast traffic in a wireless, according to certain embodiments. In step S10, a packet is received by the access point and in step S11, the packet is sent or transmitted by the access point before transmitting a beacon frame. In step S12, it is determined whether any of the receiving stations or clients is in a power saving mode or sleep mode. If this is the case, the flow continues to step S13 and the packet stored or buffered in the access point is transmitted again after a DTIM beacon frame. The re-transmission can be done at the same time when the re-transmission of data packets for conventional power saving mode is done. However, this re-transmission is additional to the first transmission of the data packets that is done before transmitting any beacon frame (and thus also before transmitting a DTIM beacon frame).

Figure 1A:
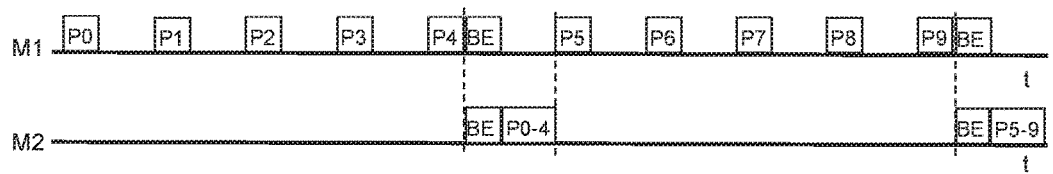
FIG. 1a shows a schematic diagram of a multicast transmission in a wireless network according to IEEE 802.11.
Figure 1B:
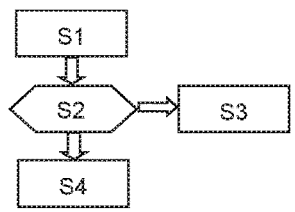
FIG. 1b discloses a flow chart of a multicast transmission.
Figure 3:
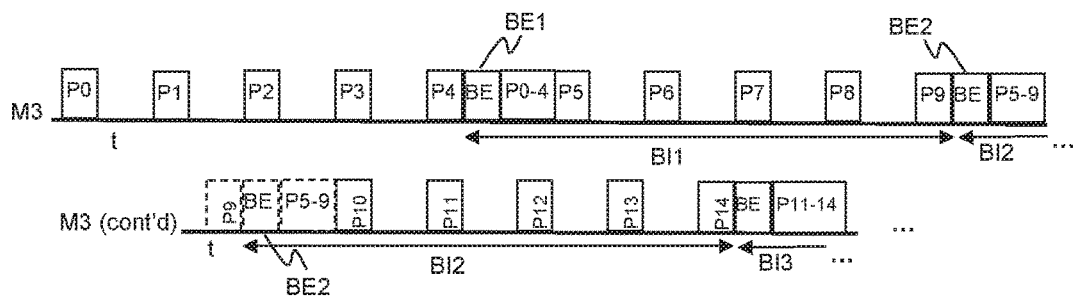
FIG. 3 shows a time diagram of a multicast traffic in a wireless network according to the invention.

According to certain embodiments, the data packets from the multicast data traffic are retransmitted if at least one of the stations or clients is in a power saving mode PS. The re-transmission of the data packets is performed after a DTIM beacon frame. As can be seen from FIG. 3, the packets P0-P4 are first transmitted immediately and before the next beacon frame BE1, as usual according to the current standard. When one or more receiving stations are in power saving mode, the packets P0-P4 are re-transmitted as a group P0-4 during the active period of those receiving stations which are in the power saving mode. This active period is after the beacon frame BE1 has been transmitted. Thereafter, the packets P5-P9 are first transmitted without delay, according to the current standard, and re-transmitted as a group P5-9 after the following beacon frame BE2. As for FIG. 3, note that it has two lines representing a timeline of a single data stream M3, where the lower timeline needs to be read as appended to the upper timeline, with an overlap drawn in dotted lines. As mentioned for FIG. 1 above, also in FIG. 3 it is assumed for simplicity that all depicted beacon frames are DTIM beacon frames, i.e. comprise a DTIM message. In a case where not all beacon frames comprise a DTIM message, one or more further beacon intervals with beacon frames not comprising a DTIM message may be transmitted after the first beacon interval BI1 and before the second beacon interval BI2. All multicast data packets destined to the multicast group and transmitted between the DTIM beacon frame BE1 of the first beacon interval BI1 and the DTIM beacon frame BE2 of the second beacon interval BI2 will be repeated after the DTIM beacon frame BE2 of the second beacon interval BI2. For example, one further beacon interval may be inserted after the first beacon interval BI1 and before the second beacon interval BI2, with a beacon frame of the further beacon interval not having a DTIM message and five additional multicast data packets P10-P14 being transmitted during the further beacon interval. Then the transmission of all multicast data packets that were transmitted since the preceding DTIM beacon frame will be repeated after the next DTIM beacon frame BE2, i.e. P5-P14 instead of P5-P9 as depicted in FIG. 3. It should be noted that the scale used for FIGS. 1a and 3 is simplified, since it may appear as if after the DTIM beacon frame there were only time to repeat transmission of four multicast data packets before the next new packet is sent. In a real case however there is enough time after the DTIM beacon frame to repeat transmission of the multicast data packets of more than one beacon interval before the next new packet is sent. Those data packets whose transmission is repeated during the second beacon interval B12 are grouped into a block of repeated data, which is transmitted after the beacon frame of the second beacon interval and before any data packet that is transmitted for the first time, i.e. before the first data packet that has not been transmitted from the access point during any earlier beacon frame.

Re-transmission of multicast data is not part of the current IEEE 802.11 ("WiFi") standard. Therefore executing the invention requires revision of the currently standardized media access control MAC as well as some aspects of the access point AP. However, advantageously, there may be no need to modify the clients or receiving stations: the present invention is compliant with conventional WiFi stations that can handle not only for unicast traffic, but also for multicast traffic, a case where an access point misses an acknowledgement signal (ACK) and thus re-sends a data packet.

According to certain embodiments, in particular those stations which are not in the power saving mode PS will receive the data packets from the multicast traffic twice. However, as they have already received these data packets, they will ignore the re-transmission of the data packets and, in some embodiments, consider only the earlier received data packets. In general, a client or receiving station, according to aspects of the present invention, can detect that when it is not in power saving mode or sleep mode, it receives a multicast data packet conventionally a first time and then the same data packet again a second time after a beacon frame. After detecting this, the client or receiving station, according to embodiments of the invention, will ignore the data packet that is received later. As a result, the receiving stations which are not in power saving mode will receive the packets with a reduced latency while the receiving stations in power saving mode experience a latency below or up to the DTIM period.

Thus, the method, according to certain embodiments of the invention, enables low latency audio streaming in an IEEE 802.11 wireless network, even if one or more multicast recipients are in power save mode or sleep mode so that they receive only beacon frames.

According to aspects of the invention, data packets of a multicast communication are transmitted once and then re-transmitted again after the next DTIM interval if at least one of the multicast recipients is in power saving mode.

Figure 4:
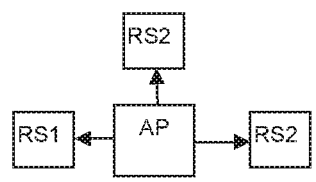
FIG. 4 shows a block diagram of a wireless network according to the invention.

FIG. 4 shows a block diagram of an IEEE 802.11 wireless network. The wireless network comprises at least one access point and several potentially but not necessarily mobile receiving stations RS1,RS2. The communication between the access point AP and the receiving stations RS1,RS2 is based on a group-addressed streaming of audio/video data. A data stream from the at least one access point AP is transmitted to the plurality of wireless receiving stations RS as multicast traffic. The data stream comprises beacon frames BE at beacon intervals B1. Data packets of the data stream are transmitted from the at least one access point AP to a plurality of wireless receiving stations as multicast traffic as soon as possible for the at least one access point AP, i.e. as if none of the receiving stations were in power saving mode. The transmission of those data of the data stream which were transmitted in a previous beacon interval B1 is repeated as multicast traffic after the current DTIM beacon frame BE.

The access point AP may comprise a buffer for buffering those data of the data stream which were transmitted during a previous beacon interval BI such that they can be re-transmitted after the current DTIM beacon frame BE. The receiving stations RS1,RS2 comprise a first and second set of receiving stations RS1, RS2. The first set of receiving stations RS1 is currently not in a power saving mode. The second set of receiving stations RS2 is currently in a power saving mode. The data packets of the data streams are transmitted to the first set of wireless receiving stations RS1 as multicast traffic as soon as they arrive in the access point AP and before the next beacon frame is transmitted. Those data packets of the data stream which were transmitted during a previous beacon interval B1 are re-transmitted as a block for the second set of wireless receiving stations RS2 as multicast traffic after the current beacon frame.

The second set of receiving stations RS2 will awake for the beacon frame BE2, detect that data packets are available for them and that these data packets will be sent soon, and keep their radio receivers switched on for receiving the data packets immediately after the DTIM beacon frame BE2. Then, they may return to power-save mode until the next beacon frame.

An advantage of the present invention, compared to conventional multicast-to-unicast conversion, is that it provides spectral savings at least for multicast transmission to more than two receivers. Conventional multicast-to-unicast conversion requires transmission of the data to each client separately, which requires more bandwidth and/or time. A further advantage is that multicast messages can be sent without adding extra latency to receivers that are not currently in PS mode. This is particularly advantageous for time-critical applications, e.g. real-time audio or video data. Conventionally, even a single client that is in PS mode, e.g. due to sleep mode or low power, would delay multicast traffic for all other clients that are not in PS mode. Thus, embodiments of the invention enable fast multicast traffic over IEEE 802.11 wireless networks even if one or more clients are in PS mode.

Figure 5:
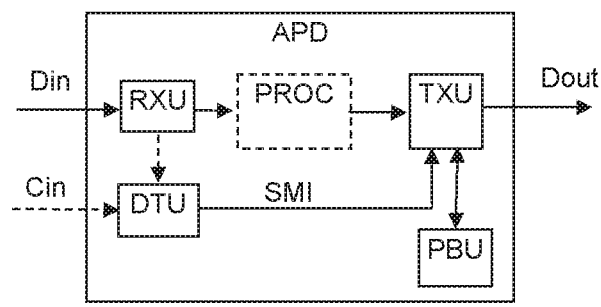
FIG. 5 shows a block diagram of a device operable as an access point in an IEEE 802.11 wireless network.

FIG. 5 shows a block diagram of an exemplary device for low latency group-addressed streaming that is operable as an access point in an IEEE 802.11 wireless network. The access point may be a simple client station which is capable of sending data directly to other stations through the network.

In some embodiments, a device APD for low latency group-addressed streaming that is usable as an access point in an IEEE 802.11 wireless network comprises at least a transmitter unit TXU and a detector unit DTU. Optionally, it may further comprise one or more other units like a receiving unit RXU for receiving an input data stream Din, a processing unit PROC and a data packet buffering unit PBU. The transmitter unit TXU is adapted to wirelessly transmit a data stream Dout as multicast traffic to a plurality of wireless receiving stations comprised in the wireless network. The output data stream Dout comprises beacon frames at beacon intervals, as described above. The detector unit DTU is adapted to detect that at least one of the wireless receiving stations is in power save mode or sleep mode and to provide a sleep mode indication SMI. The detector unit DTU may detect this from configuration information that may be received from configuration input data Cin, from the input data stream Din, from a configuration storage or similar.

The transmitter unit TXU is further adapted to transmit data packets of the data stream to the plurality of wireless receiving stations as multicast traffic as soon as the data packets are available for transmission and during a first beacon interval BI1. There are various different possibilities known for the data packets to be available for transmission, e.g. directly after their reception at the receiving unit RXU, or after any kind of data consistency check, or after any kind of data processing PROC such as e.g. encryption, decryption, re-coding, address remapping, format remapping or similar.

The transmitter unit TXU is further adapted to repeat the transmission of said data packets as multicast traffic during a subsequent second beacon interval BI2 and after transmission of a beacon frame BE2 of the second beacon interval BI2, if the detector unit DTU detected that at least one of the wireless receiving stations is in power save mode or sleep mode. The detector unit DTU may provide a sleep mode indication SMI to the transmitter unit TXU, or to a control unit that controls the transmitter unit.

In some embodiments, the device is adapted for handling a case where the beacon frame BE2 of the second beacon interval BI2 comprises a Delivery Traffic Information Map (DTIM) message and wherein at least one further beacon interval exists after the first beacon interval BI1 and before the second beacon interval BI2, and none of the beacon frames of said at least one further beacon interval comprises a Delivery Traffic Information Map (DTIM) message. In this embodiment, the transmitter unit TXU is further adapted to transmit Dout further data packets of the data stream to the plurality of wireless receiving stations as multicast traffic as soon as the further data packets are available for transmission and during said at least one further beacon interval, and the transmitter unit TXU is further adapted to repeat the transmission of the further data packets as multicast traffic during said second beacon interval BI2 and after transmission of the beacon frame BE2 of said second beacon interval.

In some embodiments, the data packets whose transmission is repeated during the second beacon interval (BI2) are grouped into a block of repeated data, and the block of repeated data is transmitted after said beacon frame of the second beacon interval and before the first data packet (P5) that has not been transmitted during any earlier beacon frame. In some embodiments, the device further comprises a packet buffering unit PBU adapted to buffer data packets at least until said repeated transmission of the buffered data packets. In some embodiments, the invention relates to a IEEE 802.11 wireless network comprising the above-described device.

The above-described embodiments are for illustration purposes only. Neither the specific embodiments of the invention as a whole, nor those of its features limit the general principles underlying the invention. It will be appreciated by those of ordinary skill in the art that in some instances some features of the invention will be employed in the absence of a corresponding use of other features. The illustrative examples therefore do not define the metes and bounds of the invention. While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method for low latency group-addressed streaming in an IEEE 802.11 wireless network, executed by an access point device, comprising the steps of:
   transmitting a data stream from the access point device to a plurality of wireless receiving stations as multicast traffic using a group address,
   wherein the plurality of wireless receiving stations comprises a first and a second set of wireless receiving stations,
   wherein the wireless receiving stations of the first set of wireless receiving stations are not in a power saving mode and the wireless receiving stations of the second set of wireless receiving stations are in a power saving mode,
   wherein the data stream comprises beacon frames at beacon intervals, and
   wherein data packets of the data stream that comprise said group address are transmitted from the access point device to the first set of wireless receiving stations as multicast traffic as soon as the data packets arrive at the access point device and before transmitting any beacon frame,
   detecting for at least one of the wireless receiving stations of said second set of wireless receiving stations that it is in power saving mode or sleep mode,
   and, upon said detecting and after transmitting a first beacon frame:
   repeating transmission of said data packets of the data stream that were transmitted before the first beacon frame and that comprise said group address as multicast traffic to the second set of wireless receiving stations, wherein wireless receiving stations of the second set are awake after the first beacon frame so that they are able to receive the re-transmitted data packets, the first beacon frame being the next beacon frame that comprises a Delivery Traffic Information Map (DTIM) message.

2. The method according to claim 1, wherein the data packets whose transmission is repeated after the first beacon frame are grouped into a block of repeated data, and the block of repeated data is transmitted immediately after said first beacon frame.

3. The method according to claim 1, further comprising buffering those data packets that were transmitted as multicast traffic before the first beacon frame in the access point such that they can be re-transmitted after the first beacon frame.

4. The method according to claim 1, wherein the access point is a simple client station, which is capable of sending data directly to other stations through the network.

5. The method according to claim 1, wherein a time interval between transmitting the data packets as multicast traffic as soon as they arrive at the access point device and repeating transmission of the data packets after said first beacon frame is shorter than a beacon interval.

6. The method according to claim 1, wherein the data stream comprises real-time audio/video data.

7. A non-transitory storage medium having stored thereon instructions that when executed on a processor that is connected to or part of an access point device causes the access point device to perform a method according to claim 1.

8. A device for low latency group-addressed streaming, the device being operable as an access point in an IEEE 802.11 wireless network, the network further comprising a plurality of wireless receiving stations and the plurality of wireless receiving stations comprising a first and a second set of wireless receiving stations, wherein the first set comprises wireless receiving stations that are not in a power saving mode and the second set comprises wireless receiving stations that are in a power saving mode, the device comprising:
- a transmitter adapted to wirelessly transmit a data stream to the plurality of wireless receiving stations as multicast traffic using a group address, the data stream comprising beacon frames at beacon intervals, wherein the transmitter transmits data packets of the data stream that comprise the group address to the first set of wireless receiving stations as multicast traffic as soon as the data packets arrive at the device and before transmitting a first beacon frame; and
- a detector adapted to automatically detect for at least one of the wireless receiving stations of the second set of wireless receiving stations being addressed by said group address that it is in power saving mode or sleep mode, wherein the transmitter is further adapted to repeat the transmission of said data packets as multicast traffic to the wireless receiving stations of said second set immediately after transmission of the first beacon frame, wherein the wireless receiving stations of the second set addressed by said group address are awake from the power saving mode or sleep mode after the first beacon frame and are able to receive the re-transmitted data packets, the first beacon frame being a next beacon frame that comprises a Delivery Traffic Information Map (DTIM) message.

9. The device according to claim 8, wherein the data packets whose transmission is repeated after the first beacon frame are grouped into a block of repeated data, and the block of repeated data is transmitted immediately after said first beacon frame.

10. The device according to claim 8, further comprising a packet buffer adapted to buffer data packets at least until said repeated transmission of the buffered data packets after the first beacon frame.

11. An IEEE 802.11 wireless network, comprising at least one device according to claim 8.

12. The device according to claim 8, wherein a time interval between transmitting the data packets as multicast traffic as soon as they arrive at the device and repeating transmission of the data packets after said first beacon frame is shorter than a beacon interval.

13. The device according to claim 8, wherein the data stream comprises real-time audio/video data.

* * * * *